(12) United States Patent
Pawar

(10) Patent No.: US 11,889,795 B2
(45) Date of Patent: Feb. 6, 2024

(54) SYSTEM AND METHOD TO SERVICE A CUTTING ELEMENT IN WORK MACHINE

(71) Applicant: Deere & Company, Moline, IL (US)

(72) Inventor: Sanket Pawar, Pune (IN)

(73) Assignee: Deere & Company, Moline, IL (US)

( * ) Notice: Subject to any disclaimer, the term of this patent is extended or adjusted under 35 U.S.C. 154(b) by 43 days.

(21) Appl. No.: 17/804,624

(22) Filed: May 31, 2022

(65) Prior Publication Data
US 2023/0380355 A1    Nov. 30, 2023

(51) Int. Cl.
*A01G 23/081*     (2006.01)
*F15B 13/043*    (2006.01)
*F15B 13/01*     (2006.01)

(52) U.S. Cl.
CPC ............ *A01G 23/081* (2013.01); *F15B 13/01* (2013.01); *F15B 13/043* (2013.01)

(58) Field of Classification Search
CPC .... A01G 23/08; A01G 23/081; A01G 23/083; A01G 23/085; A01G 23/087; A01G 23/089; A01G 23/091; A01G 23/093; A01G 23/095; B23D 59/002; B23D 59/008
See application file for complete search history.

(56) References Cited

U.S. PATENT DOCUMENTS

| | | | |
|---|---|---|---|
| 6,986,368 B2 | 1/2006 | Brown | |
| 7,992,603 B2 | 8/2011 | Pellymonter | |
| 9,669,562 B2 | 6/2017 | Ketonen | |
| 10,624,279 B1* | 4/2020 | Mead | A01G 23/093 |
| 2009/0229433 A1* | 9/2009 | Kovalenko | E02F 3/965 83/13 |
| 2018/0125007 A1* | 5/2018 | Gierkink | A01G 23/081 |
| 2021/0007295 A1* | 1/2021 | Lyer | B60P 3/41 |
| 2021/0243970 A1 | 8/2021 | Pawar | |
| 2021/0267132 A1* | 9/2021 | Gibson | A01G 23/083 |

\* cited by examiner

*Primary Examiner* — Kenneth Bomberg
*Assistant Examiner* — Matthew Wiblin

(57) ABSTRACT

A hydraulic system and method for service mode on a work machine is operatively coupled to a cutting element for felling trees. The hydraulic system comprises a hydraulic motor, a hydraulic pump, a feed actuator, a feed line, a directional control valve, a voltage battery, and a controller. The hydraulic motor is coupled to the hydraulic circuit for operating the cutting element. The hydraulic pump is operable to supply pressurized fluid to the hydraulic motor. The feed actuator extends or retracts the cutting element. The feed line is coupled to the hydraulic actuator. The directional control valve is located on the feed line of the feed actuator. The controller receives a cutting element service mode signal, moves the directional control valve to pressure the feed line for extending the cutting element where the valve is powered by the voltage battery upon receiving the cutting element service mode signal.

15 Claims, 4 Drawing Sheets

SYSTEM AND METHOD TO SERVICE A CUTTING ELEMENT IN WORK MACHINE

TECHNICAL FIELD

The disclosure generally relates to a hydraulic system and method for servicing a cutting element on a work machine.

BACKGROUND

Work machines with cutting elements, such as feller bunchers, require frequent servicing of the cutting element to maintain work machine efficiency and function. Cutting element maintenance (e.g. chain replacement) occurs at the worksite and often under poor lighting conditions as the work machine typically works under a canopy of trees. Method of safe replacement requires turning off the hydraulic system and/or the work machine. As the hydraulic system depressurizes, internal back pressure in the hydraulic system does not allow access to the cutting element (i.e. the cutting element retracts inside the housing of the felling head where the back pressure resists its further movement). Present procedures require temporarily adjusting the hydraulic settings manually with a screwdriver to enable an operator to pull the cutting element outside of the felling head. Once serviced, the hydraulic settings are adjusted once more prior to the work machine starting. Therein lies an opportunity to alleviate the current laborious method in addition to shortening the timeframe of servicing.

SUMMARY

A hydraulic system and method for servicing a cutting element on a work machine is disclosed. A hydraulic system with a service mode for felling trees includes a hydraulic system operatively coupled to a cutting element in the felling head. The hydraulic system comprises a hydraulic motor, a hydraulic pump, a feed actuator, a feed line, a directional control valve, a voltage battery, and a controller. The hydraulic motor is coupled the hydraulic circuit for operating the cutting element. The hydraulic pump is operable to supply pressurized fluid to the hydraulic motor. The feed actuator is for extending and retracting the cutting element. The directional control valve is located on the feed line of the feed actuator. The controller has a non-transitory computer readable medium with a program instruction to direct flow in the feed line with the directional control valve. The program instruction, when executed, causes a processor of the controller to perform the following. A processor receives a cutting element service mode signal, and moves the directional control valve to pressurize the feed line for extending the cutting element, wherein the directional control valve is powered by the voltage battery upon receiving the cutting element service mode signal.

The program instruction may further cause the processor of the controller to move the directional control valve to depressurize the feed line for retracting the cutting element after the cutting element has been serviced.

The cutting element service mode signal in enable only when one or more of the hydraulic pump and the work machine engine is off.

The feed line pressure is greater than the dissipation pressure in the hydraulic circuit during the service mode.

In one embodiment, the dissipation pressure may be redirected to pressure the feed line.

The service mode may actuate manually by a selection on a user input interface.

The service mode may actuate automatically upon reaching one or more of a threshold number of revolutions of the cutting element, a threshold maximum pressure in the hydraulic circuit, and a threshold working time of the cutting element.

A method of servicing a work machine including a cutting element in a felling head is disclosed. The method includes turning off one or more of a hydraulic pump and the work machine engine, receiving a cutting element service mode signal, and moving a directional control valve located on a feed line of a hydraulic circuit. The feed line is coupled to a feed actuator to extend the cutting element upon receiving the cutting element service mode signal, wherein movement of the directional control valve is powered by a voltage battery. The method may further comprise moving the directional control valve to depressurize the feed line for retracting the cutting element, after the cutting element has been serviced.

The above features and advantages and other features and advantages of the present teachings are readily apparent from the following detailed description of the best modes for carrying out the teachings when taken in connection with the accompanying drawings.

DETAILED DESCRIPTION

Figure 1:
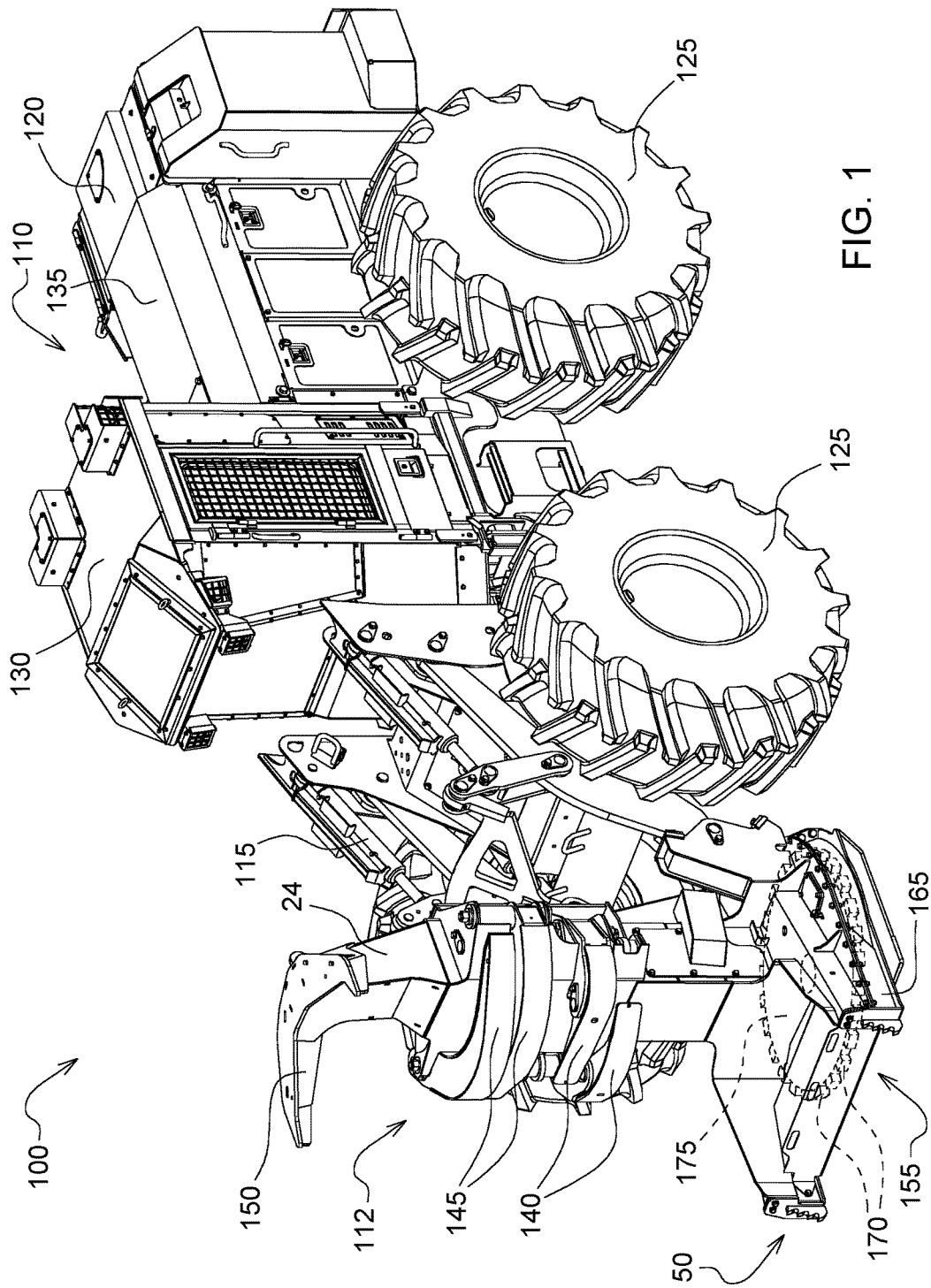
FIG. 1 is a perspective view of a work machine with a felling head according to a first embodiment.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, unless otherwise limited or modified, lists with elements that are separated by conjunctive terms (e.g. "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, "controller" 10 is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 10 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 10 may be in communication with other components on the work machine, such as hydraulic components, electrical components, and operator inputs within an operator station of an associated work machine. The controller may be electrically connected to these other components by a wiring harness such that messages, commands, and electrical power may be transmitted between the controller and the other components. Although the controller is referenced in the singular, in alternative embodiments the configuration and functionality described herein can be split across multiple devices using techniques known to a person of ordinary skill in the art.

The controller 10 may be embodied as one or multiple digital computers or host machines each having one or more processors 20, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 30 may include any non-transitory/tangible medium which participates in providing data or computer-readable instructions. The memory 30 may be non-volatile or volatile. Non-volatile media may include, for example, optical or magnetic disks and other persistent memory. Example volatile media may include dynamic random-access memory (DRAM), which may constitute a main memory. Other examples of embodiments for memory 30 include a floppy, flexible disk, or hard disk, magnetic tape or other magnetic medium, a CD-ROM, DVD, and/or any other optical medium, as well as other possible memory devices such as flash memory.

The controller 10 includes the tangible, non-transitory memory on which are recorded computer-executable instructions, including a monitoring algorithm. The processor 20 of the controller is configured for executing the program instruction 40. The program instruction implements a method 300 of servicing a forestry machine, or more specifically servicing a cutting element 50 of the forestry machine.

As such, a method 300 may be embodied as a program or algorithm operable on the controller 10. It should be appreciated that the controller 10 may include any device capable of analyzing data from various sensors, comparing data, making decisions, and executing the required tasks.

Referring now to the drawings, FIG. 1 illustrates a work machine 100 in a first embodiment as forestry machine with a felling head 112. In this embodiment, the forestry machine 100 takes the form of a feller buncher including a frame 110 and a felling head 112 attached to the front of the frame 110. The frame 110 may be, for example, wheeled, as shown, for example, in FIG. 1, or tracked. In general, the forestry machine fells, accumulates, and transports to a staging area a number of trees in an area to be harvested.

The frame 110 has a front section 115 and a rear section 120, which are articulated to one another for articulated steering of the carrier. A pair of hydraulic steering cylinders extends between the front and rear sections 115, 120 to pivot the front section 115 relative to the rear section 120 about a vertical axis at the articulation joint. Each section has left and right ground-engaging wheels 125. In a tracked carrier, the wheels on each side of the carrier would be replaced by a track. The rear section 120 contains the operator station 130, from which a human operator can operate the machine 100, and an engine compartment housing the work machine engine 135 of the machine 100.

The first exemplary embodiment of the felling head 112 includes a cutting element 50, accumulator arms 140, gathering arms 145, and a horn 150. Accumulator arms 140, gathering arms 145, and horn 150 are of conventional design. The cutting element 50 includes a rotatable disk saw 155 mounted for rotation about its axis of rotation 160 within the housing 165 at a variable saw speed. Cutting teeth 170 spaced apart around the periphery thereof for felling a selected tree. The disk is positioned and rotates below a stationary shelf 175. Teeth 170 extend upwardly around the edge of the shelf 175 so that the trees may be effectively felled and placed upon the shelf 175. The cutting element 50 is driven rotationally by a hydraulic motor (shown in FIG. 3). During operation, the trees are felled with the cutting element 50 in a cutting zone thereof, exposed outside the housing 165 at the front of the cutting element section 50, and are positioned on top of the non-rotating shelf 175. The felled trees are gathered and accumulated on the shelf 175 using the gathering arms 145 and accumulator arms 140.

Figure 2:
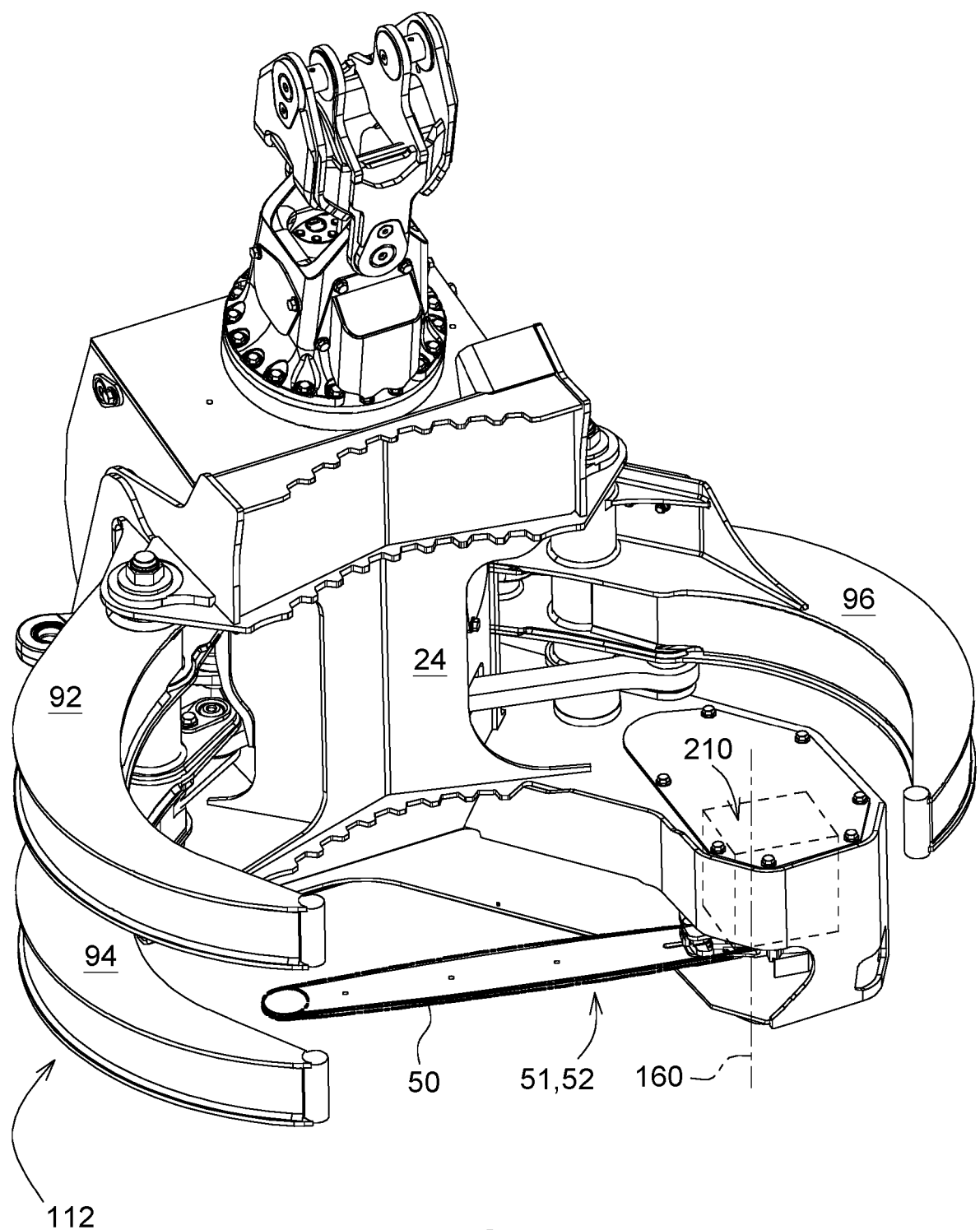
FIG. 2 is a perspective view of a felling head of a work machine according to a second embodiment.

A second exemplary embodiment of a felling head 112 is shown in FIG. 2. The felling head 112 includes a felling head frame 24 and a hydraulic motor 210 coupled to the header frame 24. The hydraulic motor 210 has an output shaft (not shown), which is further coupled to a sprocket coupled to or included by the cutting element 50 (shown as a saw bar 51 with a cutting chain 52). The sprocket may be directly or indirectly be coupled to the cutting chain 52 of the saw bar 51. The arms of the felling head 112 in this embodiment includes a first arm 92, a second arm 294, and a third arm 296 cooperating with one another to secure a tree in a cutting operation.

The cutting element 50 or portions thereof (e.g. teeth 170 or alternatively the cutting chain 52) can require frequent replacement. Teeth, or cutting teeth 170 may be used interchangeably with the term cutting chain 52, as both configurations are available for felling heads. During replacement, the work machine 100 is turned off or alternatively the hydraulics 200 are disengaged to allow for the cutting element 50 to be pulled out with hands. Internal hydraulic back pressure 215 (shown in FIG. 3) in the hydraulic circuit 200 does not enable the cutting element 50 to be pulled out of the housing 165 unless the hydraulic settings are changed with a screwdriver. After cutting chain 52 or teeth replacement, settings are restored to the same level using the screwdriver. Low lighting conditions and the worksite environment can make it difficult to find the screw location on the felling head 112. Alternatively, extending the cutting element 50 through user input interface 225 commands, the work machine 100 and the hydraulics 200 (or at minimum the pump pressure 230) must be in an enabled state. Typically, the cutting element 50 extend needs to be actively pressurized. Turning either the work machine 100 or hydraulic pump 235 off would begin a default retraction of the cutting element 50 into the felling head 112 because of back pressure 215 dissipating in the off mode. The saw chain 170 replacement itself may take a couple of minutes. Saw chain replacement when the hydraulic pump 235 or work machine 100 (e.g. engine, work machine power source) is turned on poses a hazard to the operator. The following hydraulic system and method with a service mode 240 addresses these issues. Cutting element 50 movement into (retraction) and out of (extension) of the felling head is controlled by a feed actuator 245. When the cutting element 50 is not energize because the hydraulic system or the work machine engine was shut down, constant back pressure prevents the cutting element 50 from inadvertently rotating out of the felling head 112. When commanded when powered, forward pressure overcomes the back pressure to extend the cutting element outwards. Dissipation pressure 285 is the dissipation of the forward pressure (the active function) while the back pressure (the passive function) retracts the cutting element 50 back into the felling head 112.

Figure 3:
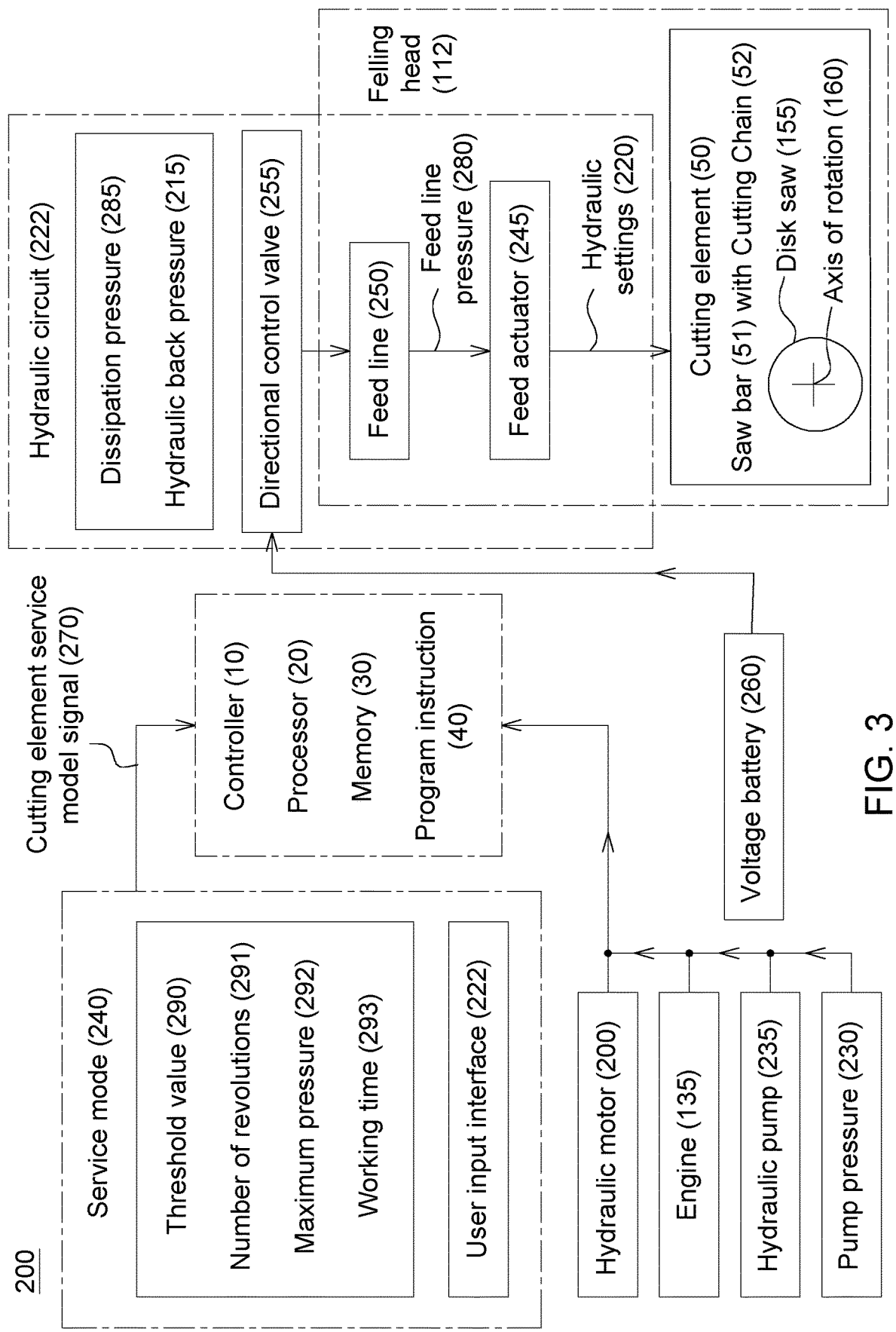
FIG. 3 is a block diagram of the system architecture of the hydraulic system.

FIG. 3 is a block diagram of the system architecture and the flow of the hydraulic system 200 with service mode 240. The system 200 comprises a hydraulic motor 210 coupled to the hydraulic circuit 222 for operating the cutting element 50, a hydraulic pump 235, a feed actuator 245, a feed line 250, a directional control valve 255, a voltage battery 260, and a controller 10. The hydraulic pump 235 is operable to supply pressurized fluid to the hydraulic motor 210. The feed actuator 245 extends or retracts the cutting element 50. The feed line 250 is couple to the feed actuator 245. The directional control valve 255 is located on the feed line 250 of the feed actuator 245. The controller 10 has a non-transitory computer readable medium 30 with a program instruction 40 to direct flow in the feed line 250 with the directional control valve 255. The program instruction 40 when executed causes a processor 20 of the controller 10 to perform the following steps. The processor 20 receives a cutting element service mode signal 270 and moves the directional control valve 255 to pressure the feed line 250 for extending the cutting element 50. The directional control valve 255 is powered by the voltage battery 260 upon receiving the cutting element service mode signal 270.

The program instruction 40 may further cause the processor 20 of the controller 10 to move the directional control valve 255 to depressurize the feed line 250 for retracting the cutting element 50 after the cutting element 50 has been serviced.

The cutting element service mode signal 270 is enabled only when one of the hydraulic pump 235 and a work machine engine 135 is turned off.

When the cutting element 50 is extended, the feed line pressure 280 is greater than the dissipation pressure 285 in the hydraulic circuit 222 when in service mode 240.

This may occur by keeping the dissipation pressure 285 elevated during when either or both of the hydraulic pump 235 and the work machine engine 135 are turned off.

Alternatively, the dissipation pressure 285 may be redirected to pressure the feed line 250.

If performed manually, an operator may actuate the service mode 240 by a selection on a user input interface 225.

If performed automatically, the service mode 240 may actuate upon reaching a threshold value 290 relevant to cutting element 50 wear. This can include a number of revolutions 291, a maximum pressure 292, and a working time 293 of the cutting element 50.

Figure 4:
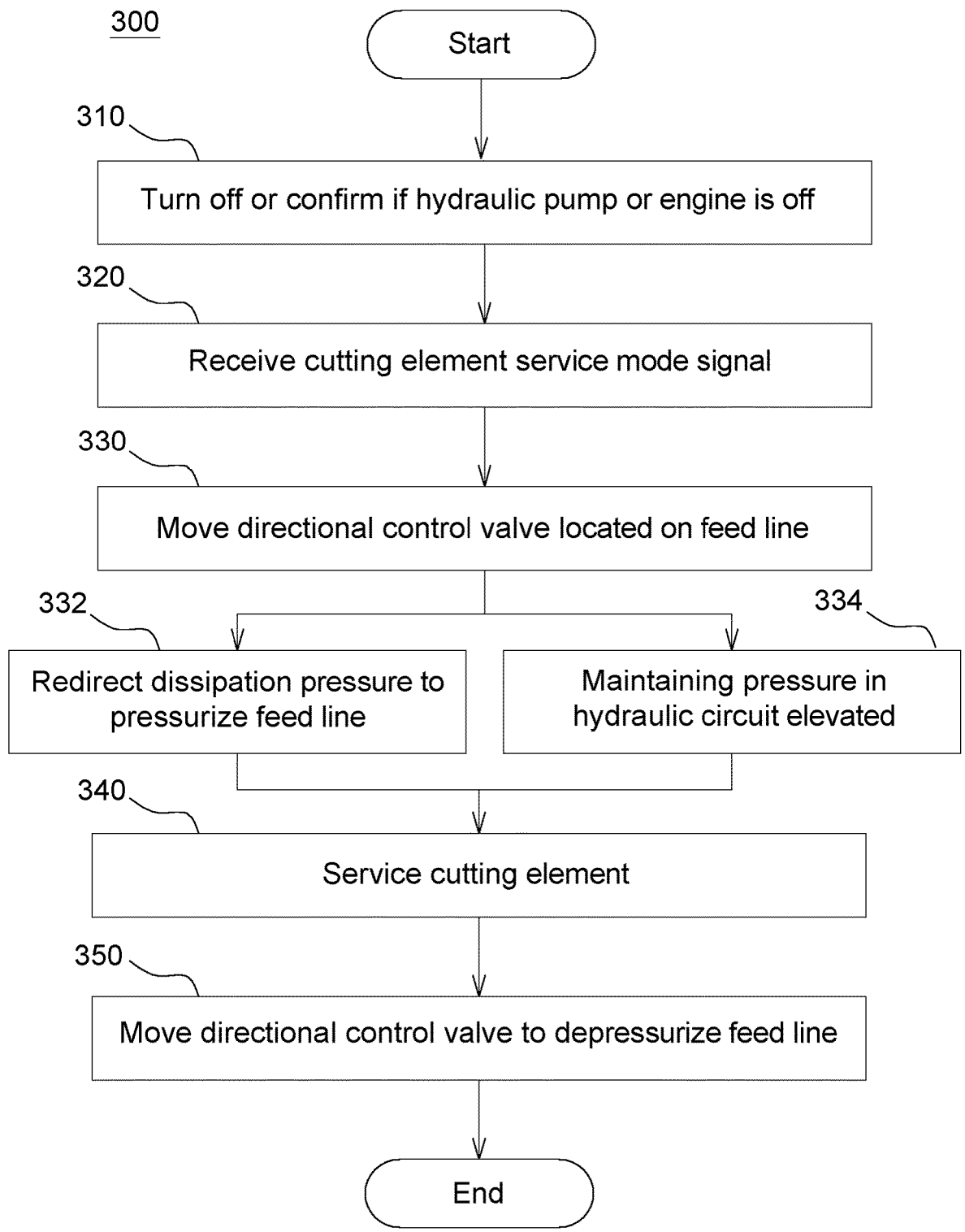
FIG. 4 is a flow diagram of a method of servicing a cutting element on a work machine.

Now turning to FIG. 4, a method 300 for servicing a forestry machine, or more specifically the cutting element 50 in a felling head 112, is shown. In a first step 310, the method comprises turning off or confirming one of the hydraulic pump 235 and the work machine engine 135 is turned off. This can be performed manually by an operator. Alternatively, the operator may actuate a service mode 240 on the work machine to perform step 310. In a second step 320, the controller receives a cutting element service mode signal 270, wherein step 310 and step 320 are interchangeable. Note the cutting element service mode signal 270 is only enabled when one of the hydraulic pump 235 and the work machine engine 135 is off. The method in step 330 includes moving a directional control valve 255 located on a feed line 250 wherein the feed line is coupled to a feed actuator 245 to extend the cutting element 50 upon receiving the cutting element service mode signal 270. Movement of the directional control valve 255 is powered by a source other than the work machine, such a voltage battery 260. Furthermore, movement of the directional control valve 255 must occur before a dissipation pressure 285 in the hydraulic circuit 222 reaches zero (i.e. completely dissipates). When extending the cutting element 50, the feed line pressure 280 is greater than the dissipation pressure 285 in the hydraulic circuit 222 during the service mode 240. This can be further supported by redirecting the dissipation pressure 285 to pressurize the feed line in step 332. Or in step 334, keeping the pressure, which would otherwise dissipate, in the hydraulic circuit 222 elevated. After the cutting element 50 has been serviced in step 340, step 350 includes moving the directional control valve 255 to depressurize the feed line 250 for retracting the cutting element 50 after the cutting element has been serviced.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of" "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:
1. A hydraulic system with a service mode for a work machine, the hydraulic system operatively coupled to a cutting element for felling trees, the hydraulic system comprising:
   a hydraulic motor coupled to a hydraulic circuit for operating the cutting element;
   a hydraulic pump operable to supply pressurized fluid to the hydraulic motor;

a feed actuator for extending and retracting the cutting element;

a feed line coupled to the feed actuator;

a directional control valve located on the feed line of the feed actuator;

a voltage battery; and a controller having a non-transitory computer readable medium with a program instruction to direct flow in the feed line with the directional control valve, the program instruction when executed causing a processor of the controller to:

receive a cutting element service mode signal; and move the directional control valve to pressurize the feed line for extending the cutting element, wherein the directional control valve is powered by the voltage battery upon receiving the cutting element service mode signal, wherein moving the directional control valve to pressurize the feed line for extending the cutting element comprises applying a forward pressure in the feed line that is greater than and overcomes a back pressure that prevents the cutting element from extending;

wherein to extend the cutting element, the forward pressure applied to the feed line remains elevated above the back pressure when one of the hydraulic pump and a work machine engine is off.

2. The hydraulic system of claim 1 wherein the program instruction further causes the processor of the controller to move the directional control valve to depressurize the feed line for retracting the cutting element after the cutting element has been serviced.

3. The hydraulic system of claim 1 wherein the cutting element service mode signal is enabled when at least one of the hydraulic pump and a work machine engine is off.

4. The hydraulic system of claim 1, wherein moving the directional control valve to pressurize the feed line for extending the cutting element comprises redirecting the back pressure to the feed line.

5. The system of claim 1, wherein the cutting element service mode signal actuates manually by a selection on a user input interface.

6. The system of claim 1, wherein the cutting element service mode signal actuates automatically upon reaching one or more of a threshold number of revolutions of the cutting element, a threshold maximum pressure in the hydraulic circuit, and a threshold working time of the cutting element.

7. A method for servicing a work machine, the work machine comprising a cutting element in a felling head, the method comprising:

turning off one or more of a hydraulic pump and a work machine engine;

receiving a cutting element service mode signal; and moving a directional control valve located on a feed line of a hydraulic circuit, the feed line coupled to a feed actuator to extend the cutting element upon receiving the cutting element service mode signal, wherein movement of the directional control valve is powered by a voltage battery wherein to extend the cutting element, a forward pressure applied to the feed line remains elevated above the back pressure when one of the hydraulic pump and the work machine engine is off.

8. The method of claim 7 further comprising:

moving the directional control valve to depressurize the feed line for retracting the cutting element after the cutting element has been serviced.

9. The method of claim 7 wherein the cutting element service mode signal is enabled when at least or more of the hydraulic pump and the work machine engine is off.

10. The method of claim 7 wherein while extending the cutting element, a forward pressure in the feed line is greater than and overcomes a back pressure that prevents the cutting element from extending.

11. The method of claim 7 wherein moving the directional control valve to pressurize the feed line for extending the cutting element comprises redirecting a back pressure that prevents the cutting element from extending to the feed line.

12. The method of claim 7 wherein the cutting element service mode signal actuates manually by a selection on a user input interface.

13. The method of claim 7 wherein the cutting element service mode signal actuates automatically upon reaching one or more of a threshold number of revolutions of the cutting element, a threshold maximum pressure of the hydraulic circuit, and a threshold working time of the cutting element.

14. The method of claim 7 wherein the hydraulic pump is operable to supply pressurized fluid to a hydraulic motor, the hydraulic motor coupled to the hydraulic circuit for operating the cutting element.

15. The method of claim 7 wherein the directional control valve is moved before a pressure in the feedline dissipates to zero.

* * * * *